Oct. 25, 1927.
G. C. MONCKMEIER
1,646,416
AUTOMATIC THRUST BEARING
Filed March 15, 1926
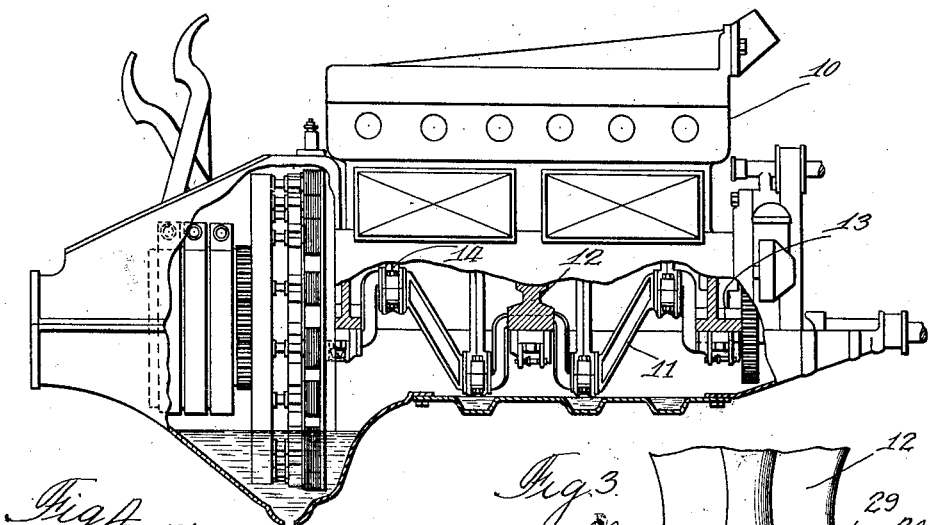
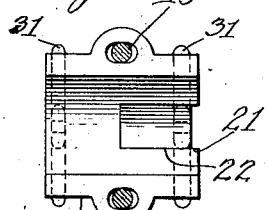
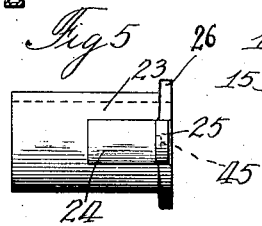
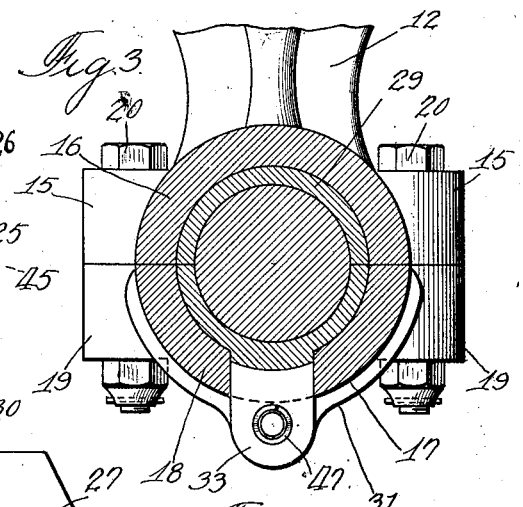
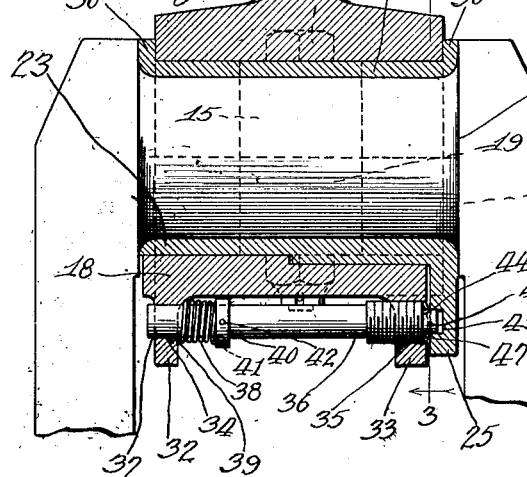
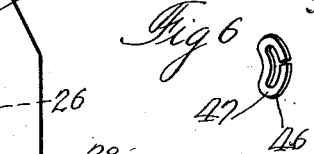
Inventor:
Gustav C. Monckmeier.
By John P. Smith
Attys Patented Oct. 25, 1927.

1,646,416

UNITED STATES PATENT OFFICE.

GUSTAV C. MONCKMEIER, OF TIPTON, IOWA.

AUTOMATIC THRUST BEARING.

Application filed March 15, 1926. Serial No. 94,630.

This invention relates to an automatic thrust bearing which is more particularly adapted as a thrust bearing on main engine bearings for crank shafts.

The invention is particularly adapted for automobile engines of the Ford type in which the crank shaft is supported in bearings having lower removable bearing caps, but it will of course, be understood that the same may be adapted for use for main crank shaft bearings for other types of automobile engines other than Fords by slight modifications.

In the Ford type of automobile engine the crank shaft at the rear end extends through a stationary circumferentially arranged series of electric pole members which are adapted to co-operate with a rotor or disc mounted on the crank shaft. This rotor or disc carries a series of peripherally arranged permanent magnets which must be held in relatively fixed rotary position with respect to the circumferentially arranged stationary electric pole members in order to efficiently maintain the proper spaced relation between the stationary member and the rotary member. It has been found by experience that the bearing cap or more particularly the soft metal bearing bushings in the course of time wear at their ends, thus permitting the crank shaft to have too great a longitudinal movement or play, which, in turn, causes too great a space under certain conditions between the stationary electric pole members and the rotary disc, so as to render these parts inoperative. Under these conditions, it is necessary to replace the worn parts, which, in turn, involves the dismounting of the engine from the chassis or frame of the car and burdening the owner of the car with great expense both in the cost of time and replacement of the worn parts.

It is therefore one of the objects of the present invention to provide an automatic thrust bearing which will compensate for end wear which ensues on the main bearings of the crank shaft and maintain the co-operative relation between the stationary electric pole members and the rotor or disc so that these members will be held in their relative positions, in which they were originally placed in the engine.

A still further object of my invention is to provide in combination with my improved automatic end thrust bearing for the main bearings of crank shafts of engines a retractile spring which is especially adapted to compensate for unusual expansion or contraction by reason of the crank shaft becoming unduly heated and then quickly cooled so that unusual friction or wear will not cause the burning out of the bearing.

These and other objects are accomplished by providing a construction and an arrangement of the various parts in the manner hereinafter described and particularly pointed out in the appended claims.

Referring to the drawings, Fig. 1 is a fragmentary side elevational view partly in cross section of a Ford type of automobile engine, showing my invention embodied therein.

Fig. 2 is a fragmentary enlarged cross sectional view taken on a vertical plane passing through the main bearing of the engine.

Fig. 3 is a cross sectional view taken on the line 3—3 in Fig. 2.

Fig. 4 is a top plan view of the main bearing cap.

Fig. 5 is a bottom plan view showing the construction of the semi-circular bearing bushing which is adapted to be mounted in the bearing cap shown in Fig. 4, and Fig. 6 is an enlarged perspective view showing the construction of my improved form of retractile spring.

In carrying out my invention I have illustrated the same in connection with a Ford engine, as indicated generally at 10, which is provided with the usual crank shaft 11, central main bearing support 12, and forward and rearward main bearings 13 and 14, respectively. The main bearing 12 is provided with laterally extending apertured ears 15 which have formed therebetween the usual semi-circular bearing portion 16. My improved bearing cap 17, which is adapted to be substituted for the cap which is regularly furnished with the engine, comprises a semi-circular portion 18 and laterally extending apertured ears 19. These apertured ears 19 of the bearing cap 17 are arranged to register with the apertured ears 15 of the main bearing 12 and are adapted to be secured thereto by bolts 20 of the usual construction. The bearing cap 17 is provided on its forward edge with a vertically extending cut-away portion, as shown at 21. Extending from the cut-away portion 21 in the bearing cap and in alignment therewith is a longitudinally extending recess 22. This longitudinally extending recess 22 is formed in the bottom or semi-circular concavity of the cap 17 and extends from substantially midway of the ends of the cap to the end of the cutaway portion 21. Mounted in the semi-circular concavity of the cap 17 and adapted for longitudinal movement with respect thereto is a semi-circular bearing bushing 23. The semi-circular bearing bushing 23 is provided on its lower side with a substantially flat rectangular projection 24 conforming to and slightly smaller than the recess 22 formed in the cap 17. The projection 24 formed on the semi-circular bushing 23 prevents relative movement of the bushing in a rotary direction with respect to the cap, but at the same time permits the bearing bushing 23 to move longitudinally of the cap for taking up the end wear in a manner hereinafter described. Extending downwardly from the forward edge of the semicircular bearing bushing 23 is a laterally extending ear or thrust bearing portion 25. This ear 25 is so arranged with respect to the bushing 23 that when the same is mounted in the cap it extends through the recess 21 formed on the forward edge of the cap 17. The semi-circular bearing bushing 23 is provided with a peripheral flange 26 which forms the thrust bearing portion and is adapted to engage the finished portion 27 adjacent the crank arm 28 of one of the main crank shaft bearings. The semi-circular bearing portion 16 of the main stationary bearing 12 is provided with a semi-circular bearing bushing 29 which co-operates with the semi-circular bearing bushing 23 to form the complete bearing for the crank shaft. These bearing bushings 23 and 29 are of the usual soft metal type. The semi-circular bearing bushing 29 is provided on its opposite sides with laterally extending flanges 30. The bearing cap 17 is provided with reinforcing ribs 31. These ribs 31 extend around the bearing cap 17 and are located adjacent the ends thereof. Formed integrally with the ribs 31 and in direct alignment with each other on the bottom of the cap 17 are two ears 32 and 33. These ears are provided with apertures 34 and 35, respectively, which are arranged or located in longitudinal alignment with each other. The aperture 35 in the ear 33 is preferably threaded and is adapted to receive therein a threaded pin 36. The rearward end of the pin as shown at 37 is journalled in the aperture 34 of the ear 32. Mounted on the pin 36 adjacent the ear 32 is a torsional spring 38. One end of the torsional spring 38 is secured to the ear 32 by having one end thereof fastened in a small aperture in the ear as shown at 39. The other end of the spring is fastened in an aperture formed in a collar 40 as shown at 41. The collar 40 is secured to the pin 36 by a transverse cotter or rivet 42. The forward end of the pin 36 is provided with a relatively reduced portion 43 forming a shoulder 44 adjacent the threaded end of the pin. The reduced portion 43 is adapted to extend into a socket 45 which is relatively larger than the reduced portion 43 of the pin and is formed on the inner side of the ear 25 of the semi-circular bearing bushing 23.

In connection with my automatically actuated thrust bearing I have provided a means which is adapted to compensate for any excess expansion or contraction of the crank shaft which may be caused by wide variations in temperatures within the engine. In extreme cases the crank shaft may become excessively heated causing an expansion of the bearing portion of the crank shaft and then by reason of the cooling of the crank shaft the bearing portion of the crank shaft may contract, and in order to allow for this extreme condition I have provided a split retractile spring 46 which is in the form of a washer having its opposite sides, as shown at 47, bent out of the normal plane of the spring washer so that if excessive pressure is placed on the spring washer, it has a tendency to flatten out and thereby permit the bearing portion of the crank shaft to contract after being excessively heated without causing any undue wear on the end thrust bearing portion 26 of the semi-circular bearing bushing 23. This retractile spring washer 46 is mounted on the reduced portion 43 of the pin 36 and is positioned adjacent one edge of the aperture 35 of the ear 33 so that the shoulder 44 is arranged to compress the spring between the shoulder 44 and that portion of the ear 25 surrounding the socket 45.

In the operation of the above device, it will of course be understood that my improved cap 17 is adapted to be substituted for the cap ordinarily furnished with the engine and when secured in the manner above described and illustrated in the accompanying drawings the pin 36 is placed under a torsional spring tension by the spring 38 so that when wear ensues on the thrust bearing portion 26 of the semi-circular bearing bushing 23 the pin moves forwardly with respect to the cap by reason of the screw threaded engagement with the ear 33 and compresses the retractile spring 46 and forces the semi-circular bearing bushing 23 forwardly with respect to the bearing cap 17 so that any end wearer on the bearing is automatically taken up as wear ensues, thereby eliminating the difficulties above pointed out encountered by the constructions now in use, and also eliminating the necessity of dismounting the engine and making repairs.

While I have described my improved automatic bearing in combination with a retractile spring, it will of course, be understood that an ordinary washer may be substituted therefor without interfering with the efficient operation of my automatic thrust bearing, but under exceptional or unusual conditions it may be found very efficient and reduces the excessive wear which might be encountered.

It will be noted that the apertures as indicated at 19' in the ears 19 of the cap 17 are oblong in shape so as to afford an adjustment of the cap with respect to the main bearing portion 12 of the engine. This is to permit additional adjustment in varying conditions found in the different types of engines.

While in the above specification I have described the invention as being adapted to the center main bearing 12 it will of course be understood that it is equally adapted to the other main bearings of the Ford type of automobile engine as well as main bearing in other types of engines, in which the compensation for axial wear of the thrust portion of the bearing is desired. I therefore desire to be understood as not limiting myself to the particular use above described inasmuch as modification may be made without departing from the spirit and scope of the invention as expressed in the following claims.

What I claim as my invention and desire to secure by Letters Patent is:

1. In combination with a crank shaft, a bearing support for said crank shaft, a bearing cap secured to said bearing support, semi-circular bearing bushings mounted in said bearing support and cap, and means mounted on said cap for automatically moving one of said semi-circular bearing bushings with respect to said cap for taking up the end wear on said bearing.

2. In combination with a crank shaft, a main bearing support for said crank shaft, a cap secured to said main bearing support, semi-circular bearing bushings mounted between said bearing support and said cap, and means mounted on said bearing cap and engageable with one of said semi-circular bearing bushings for automatically taking up the end wear on said bearing.

3. In combination with a crank shaft, a main bearing support for said crank shaft, a cap secured to said main bearing support, semi-circular bearing bushings mounted between said bearing support and said cap, and spring actuated means mounted on said bearing cap and engageable with one of said semi-circular bearing bushings for automatically taking up the end wear on said bearing.

4. In combination with a crank shaft, a main bearing support for said crank shaft, a cap secured to said main bearing support, semi-circular bearing bushings mounted between said bearing support and said cap, and spring actuated means mounted on said bearing cap and engageable with one of said semi-circular bearing bushings for moving said bearing bushing longitudinally with respect to said cap for taking up the end wear on said bearing.

5. In combination with a crank shaft, a main bearing support for said crank shaft, a cap secured to said main bearing support, semi-circular bearing bushings mounted between said bearing support and said cap, and longitudinally extending spring actuated means mounted on said cap and engageable with one of said semi-circular bearing bushings for moving said bushing axially of said bearing for automatically taking up the end wear on said bearing.

6. In combination with a crank shaft, a main bearing support for said crank shaft, a cap secured to said main bearing support, semi-circular bearing bushings mounted between said bearing support and said cap, and rotary actuated means mounted on said bearing cap and engageable with one of said semi-circular bushings for actuating said bushing axially of said bearing for automatically taking up the end wear on said bearing.

7. In combination with a crank shaft, a main bearing support for said crank shaft, a cap secured to said main bearing support, semi-circular bearing bushings mounted between said bearing support and said cap, means carried by said cap for preventing rotary movement of one of said semi-circular bushings with respect to said cap, and means mounted on said cap and engageable with one of said semi-circular bearing bushings for automatically adjusting said last named semi-circular bushing longitudinally of said cap.

8. In combination with a crank shaft, a main bearing support for said crank shaft, a cap secured to said main bearing support, semi-circular bearing bushings mounted between said bearing support and said cap, one of said semi-circular bearing bushings having a lateral projection formed integrally therewith, said cap having a recess formed therein for receiving the lateral projection on said last named semi-circular bushing for preventing rotary movement between said semi-circular bushing and cap, and a spring actuated means mounted on said cap and engageable with said last named bushing for automatically taking up the end wear on said main bearing.

9. In combination with a crank shaft, a main bearing support for said crank shaft, a cap secured to said main bearing support, semi-circular bearing bushings mounted between said bearing support and said cap, one of said semi-circular bearing bushings having a lateral projection formed integrally therewith, said cap having a recess formed therein for receiving the lateral projection on said last named semi-circular bushing for preventing rotary movement between said semi-circular bushing and cap, and a rotatable spring actuated spring pin carried by said cap having one end thereof engageable with said semi-circular bushing for automatically moving said bushing longitudinally of said cap.

10. In combination with a crank shaft, a main bearing support for said crank shaft, a cap secured to said main bearing support, semi-circular bearing bushings mounted between said bearing support and said cap, a laterally projecting ear extending on one side of one of said semi-circular bushings, and a spring actuated member carried by said cap and engageable with the ear on said semi-circular bearing bushing for automatically adjusting said bushing with respect to said cap for taking up the end wear on said main bearing.

11. In combination with a crank shaft, a main bearing support for said crank shaft, a cap secured to said main bearing support, semi-circular bearing bushings mounted between said bearing support and said cap, a laterally projecting ear extending on one side of one of said semi-circular bushings, and a spring actuated member in threaded engagement with said cap and engageable with the ear on said semi-circular bearing bushing for automatically adjusting said bushing longitudinally of said cap for taking up the end wear on said main bearing.

12. In combination with a crank shaft, a main bearing support for said crank shaft, a cap secured to said support, a sectional bearing bushing mounted between said support and said cap, spring actuated means carried by said cap and engageable with one section of said bearing bushing for automatically adjusting said section for taking up the end wear on said bearing.

13. In combination with a crank shaft, of a main bearing support for said crank shaft, a cap secured to said bearing support, an adjustable bushing mounted between said support and said cap, means for automatically moving said bushing with respect to said cap, and means for permitting retractile movement of said bushing with respect to said cap.

14. In combination with a crank shaft, a main bearing support for said crank shaft, a cap secured to said bearing support, an adjustable bushing mounted between said support and said cap, spring actuated means for automatically moving said bushing with respect to said cap, and means for permitting retractile movement of said bushing with respect to said cap.

15. In combination with a crank shaft, a bearing support for said crank shaft, a bearing cap secured to said bearing support, semi-circular bearing bushings mounted between said bearing support and cap, means mounted on said cap for automatically moving one of said semi-circular bearing bushings with respect to said cap for taking up the end wear on said bearing, and means associated with said first named means for permitting retractile movement of said last named semi-circular bushing with respect to said cap.

16. In combination with a crank shaft, a bearing support for said crank shaft, a bearing cap secured to said bearing support, semi-circular bearing bushings mounted between said bearing support and cap, means mounted on said cap for automatically moving one of said semi-circular bearing bushings with respect to said cap for taking up the end wear on said bearing, and resilient means associated with said first named means for permitting retractile movement of said last named semi-circular bushing with respect to said cap.

17. In combination with a crank shaft, a main bearing support for said crank shaft, a cap secured to said main bearing support, semi-circular bearing bushings mounted between said bearing support and said cap, a laterally projecting ear extending on one side of one of said semi-circular bushings, a spring actuated member carried by said cap and engageable with the ear on said semi-circular bearing bushing for automatically adjusting said bushing with respect to said cap for taking up the end wear on said main bearing, and resilient means mounted on said spring actuated member for permitting retractile movement of said last named semi-circular bearing bushing with respect to said cap.

18. In combination with a crank shaft, a main bearing support for said crank shaft, a cap secured to said main bearing support, semi-circular bearing bushing mounted between said bearing support and said cap, said cap having a longitudinally extending recess formed therein, one of said semi-circular bearing bushings having a lateral projection formed thereon and engageable with the recess formed in said cap whereby said semi-circular bushing is guided in its movement in respect to said cap and spring actuated means positioned axially on one side of said semi-circular bushing and in engagement therewith for adjusting said semi-circular bushing with respect to said cap.

19. In combination with a crank shaft, a main bearing for said crank shaft, a cap secured to said main bearing, a bushing for said main bearing, and means movable longitudinally of and located eccentrically with respect to said shaft and engageable with said bushing for automatically moving said bushing for taking up the end wear on said bearing.

20. In combination with a crank shaft, a main bearing for said crank shaft, a cap secured to said main bearing, a bushing consisting of two sections mounted between said cap and said bearing and means movable longitudinally of and positioned eccentrically with respect to said shaft and engageable with one of said sections for automatically moving said last-named section for taking up the end wear on said bearing.

21. In combination with a crank shaft, a main bearing for said crank shaft, a cap secured to said main bearing and having two depending ears, a bushing consisting of two sections mounted between said cap and bearing and a screw thread spring actuated member mounted in threaded engagement with one of said ears and longitudinally movable with respect to said cap and engageable with one of said sections for automatically moving said last-named section with respect to said cap for taking up the end wear on said bearing.

22. In combination with a crank shaft, a main bearing support for said crank shaft, a cap secured to said main bearing support, semi-circular bearing bushings mounted between said bearing support in said cap, one of said semi-circular bearing bushings having a flange on one end thereof and means mounted on said cap and engageable with said flange for automatically taking up the end wear on said bearing.

In testimony whereof I have signed my name to this specification, on this 20th day of February, A. D. 1926.

GUSTAV C. MONCKMEIER.